United States Patent [19]

Matsumoto et al.

[11] Patent Number: 5,513,011
[45] Date of Patent: Apr. 30, 1996

[54] METHOD AND APPARATUS FOR RECORDING OR REPRODUCING VIDEO DATA ON OR FROM STORAGE MEDIA

[75] Inventors: Mitsujiro Matsumoto; Kensuke Satoh; Kiyoshi Uchimura, all of Osaka, Japan

[73] Assignee: Matsushita Electric Industrial Co., Ltd., Osaka, Japan

[21] Appl. No.: 186,076

[22] Filed: Jan. 25, 1994

[30] Foreign Application Priority Data

Jan. 25, 1993  [JP]  Japan .................................. 5-009736
Jan. 25, 1993  [JP]  Japan .................................. 5-009738

[51] Int. Cl.⁶ .............................. H04N 5/91; H04N 5/76; G11B 5/00; G11B 5/09
[52] U.S. Cl. .......................... 358/341; 358/335; 358/343; 360/19.1; 360/32; 360/48
[58] Field of Search ................................ 358/341, 342, 358/343, 335, 310, 322; 360/19.1, 32, 48, 33.1; 369/48, 53, 58; H04N 5/76, 5/78, 5/91, 5/92, 9/79, 9/89

[56] References Cited

U.S. PATENT DOCUMENTS 4,914,527  4/1990  Asai et al. ................................ 360/32
5,309,290  5/1994  Sugiyama et al. ........................ 360/32
5,335,117  8/1994  Park et al. ............................... 360/32

OTHER PUBLICATIONS

"System Architecture for a Large Scale Video on Demand Service" by W. D. Sincoskie; Computer Networks and ISDN Systems 22(1991)155–162.

Primary Examiner—Thai Q. Tran
Attorney, Agent, or Firm—Lowe, Price, LeBlanc & Becker

[57] ABSTRACT

A method and apparatus for recording/reproducing video signals on or from storage media. A video signal is divided into k video blocks in a time-axis direction, wherein k is an integer not less than 2, finding a block skip interval s which is an integer satisfying an equation $s=(pk+1)/n$ when p is an integer not less than 1 and n is an integer not less than 2. The k video blocks are interleaved in order of $$i=\{s(j-1)\} \bmod k+$$

wherein i is an integer satisfying a relation $1 \leq i \leq k$ and representing a block number of the video signal, and j is an integer satisfying a relation $1 \leq j \leq k$ and representing an allocation block number on a storage medium (FIGS. 2(A) and 2(B)). And, thus interleaved video blocks are allocated on the storage medium (312).

8 Claims, 12 Drawing Sheets

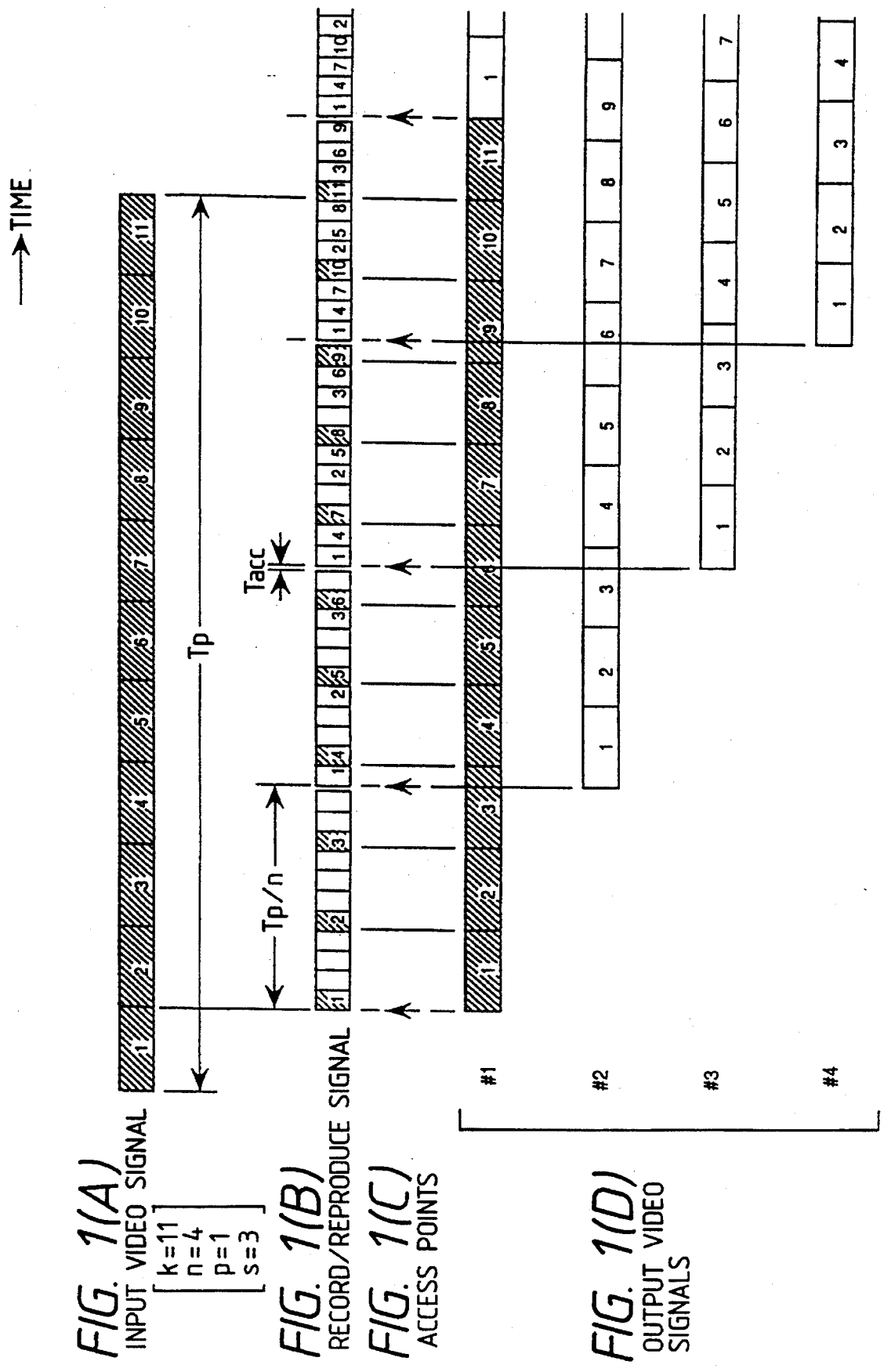

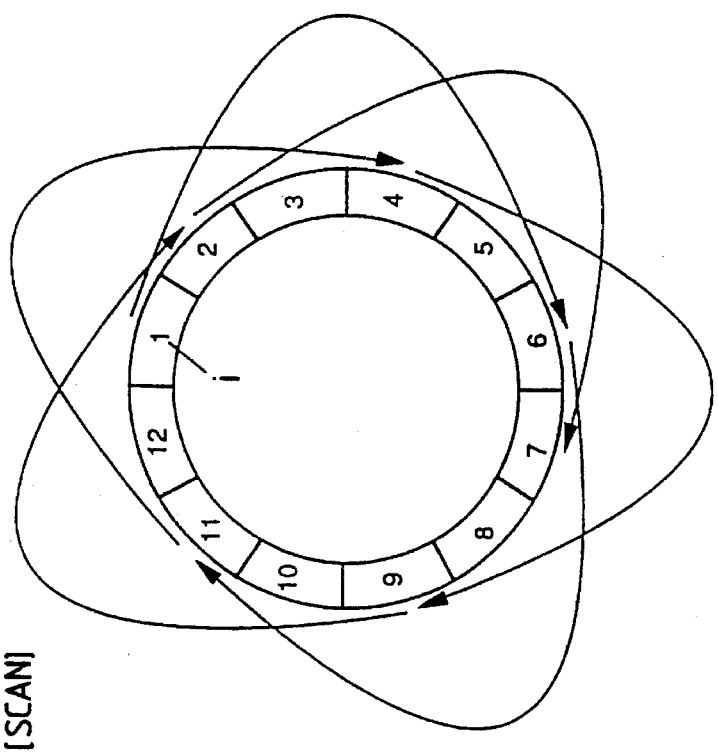
FIG. 2(A) k=11, n=4, p=1 (s=3)
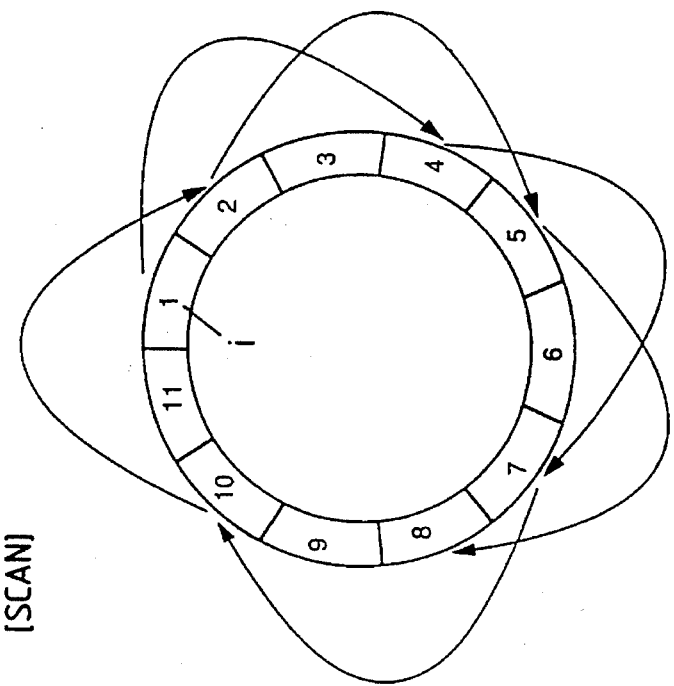
FIG. 2(B) k=12, n=5, p=2 (s=5)

| | | | | | | | | | | | |
|---|---|---|---|---|---|---|---|---|---|---|---|
| φ1 | 1(4,3) | 2(4,2) | 3(4,1) | 4(3,3) | 5(3,2) | 6(3,1) | 7(2,3) | 8(2,2) | 9(2,1) | 10(1,3) | 11(1,2) 1(4,3) |
| φ2 | 9(2,1) | 10(1,3) | 11(1,2) | 1(4,3) | 2(4,2) | 3(4,1) | 4(3,3) | 5(3,2) | 6(3,1) | 7(2,3) | 8(2,2) 9(2,1) |
| φ3 | 6(3,1) | 7(2,3) | 8(2,2) | 9(2,1) | 10(1,3) | 11(1,2) | 1(4,3) | 2(4,2) | 3(4,1) | 4(3,3) | 5(3,2) 6(3,1) |
| φ4 | 3(4,1) | 4(3,3) | 5(3,2) | 6(3,1) | 7(2,3) | 8(2,2) | 9(2,1) | 10(1,3) | 11(1,2) | 1(4,3) | 2(4,2) 3(4,1) |

→TIME i(i1,i0)

| | | | | | | | | | | | | |
|---|---|---|---|---|---|---|---|---|---|---|---|---|
| φ1 | 4 | 3 | 2 | 1 | 4 | 3 | 2 | 1 | 4 | 3 | 2 | 1 |
| φ2 | 1 | 4 | 3 | 2 | 1 | 4 | 3 | 2 | 1 | 4 | 3 | 2 |
| φ3 | 2 | 1 | 4 | 3 | 2 | 1 | 4 | 3 | 2 | 1 | 4 | 3 |
| φ4 | 3 | 2 | 1 | 4 | 3 | 2 | 1 | 4 | 3 | 2 | 1 | 4 | i1 i1 : LARGE BLOCK NUMBER
i0 : SMALL BLOCK NUMBER

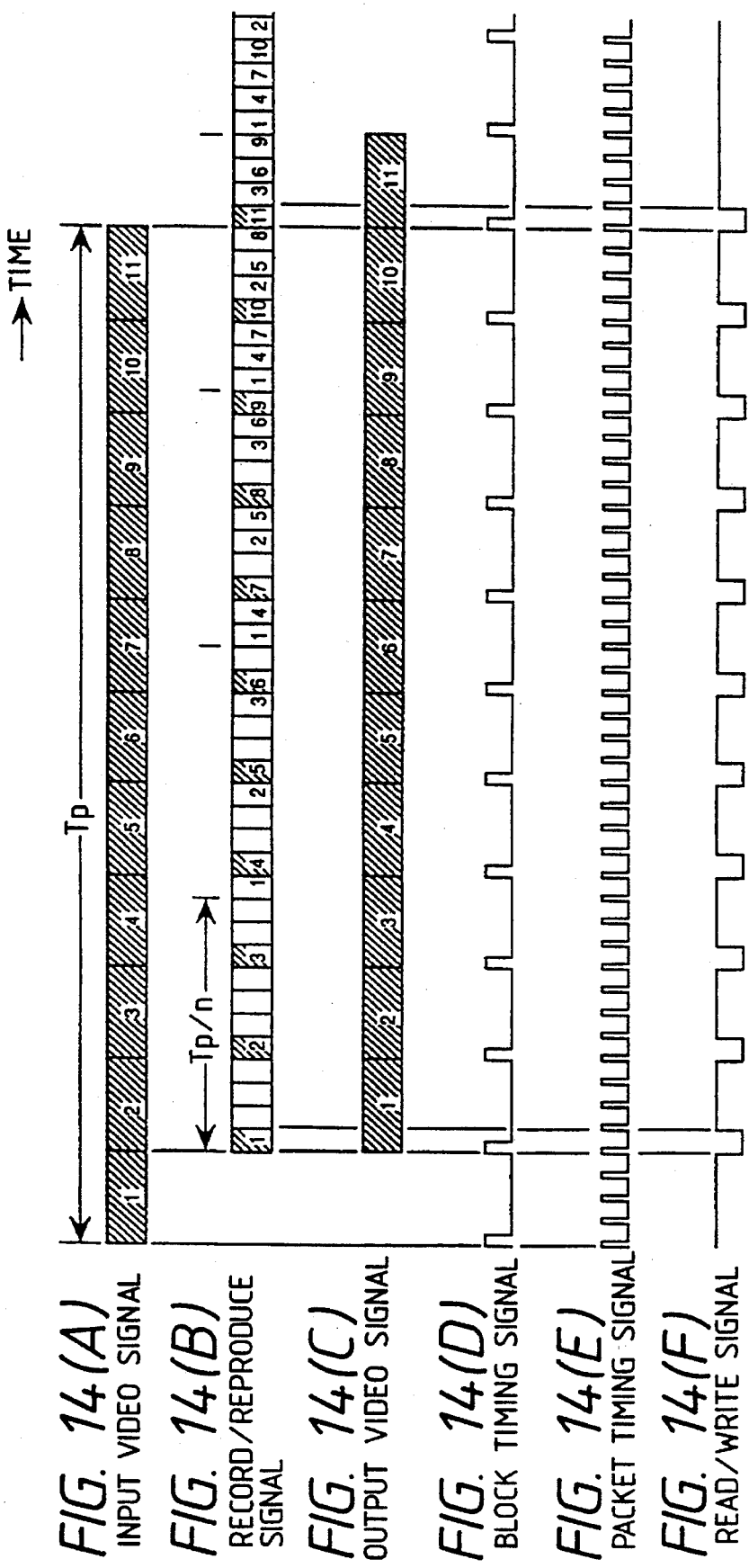

METHOD AND APPARATUS FOR RECORDING OR REPRODUCING VIDEO DATA ON OR FROM STORAGE MEDIA

BACKGROUND OF THE INVENTION

1. Field of the Invention

The present invention relates to a method and an apparatus for recording video data with compressed bandwidth, such as video signals and sound signals, on storage media and for reproducing and transmitting the video data in response to subscribers' request.

2. Prior Art

Recent rapid progress of compression technologies (i.e. high efficient coding technologies) of video signals and sound signals, development of international standardization of MPEG and others, expansion of storage capacity of storage media, and popularization of digital communication service represented by ISDN, are almost realizing the data base service of moving picture information using the digital communication network. This moving picture information service is capable of request-type service, interactive service or the like, which has not ever been realized by the conventional terrestrial broadcasting and satellite broadcasting services. Therefore, many research and development activities have been carrying out for realization of this kind of service.

It is, however, predicted that one of problems will derive from occupation of a storage medium by one user during service of moving picture information which normally has a length of several tens seconds to several hours a program. A key to the commercial base construction of such kind of system will depend on capability of allowing numerous users to share the storage media simultaneously. Furthermore, the response of the system will need to be quick enough to respond each request from users within an allowable time. For these reasons, the technologies for multiple access to the storage media will be mandatory.

To realize the multiple access, one conventional method proposes to divide moving picture information, such as video signals, into a plurality of blocks, relocate these divided blocks cyclically in a predetermined format, record them onto a disk with a plurality of heads, and reproduce a plurality of video signals having time phases different from each other. (Refer to W. D. Sincoskie "System architecture for a large scale video on demand service" Computer Networks and ISDN System 22 (1991) 155–182) According to this conventional method, the near video on demand type video service will be feasible at relatively low cost and an access time required from request to reception of video service will be shortened within an acceptable time.

However, this conventional recording/reproducing method is disadvantageous in that a special disk equipped with a plurality of recording/reproducing heads needs to be newly developed as a recording medium. This will result in cost increase of the storage medium. Furthermore, construction of interleave depends on the structure of the heads. Therefore, there is no flexibility of freely setting the number of phases to be reproduced simultaneously; i.e. the service interval of video signals. Although the read out video signals of each phase are smoothed and transmitted as a serial signal, the process of smoothing the video signals in this conventional system will be very difficult since the extracting cycle of video signals is not constant. Still further, the start point of a video signal which newly become reproducible is undesirably advanced with respect to the end point of the video signal in each phase. This results in capacity increase of the memory used for the smoothing process. Moreover, time administration will become complicated in controlling the signals streaming on the transmission line.

SUMMARY OF THE INVENTION

Accordingly, in view of above-described problems encountered in the prior art, an object of the present invention is to provide a method and an apparatus for recording or reproducing video data on or from storage media having capability of setting operational parameters irrespective of the head construction of the storage media, and realizing a function of simultaneously reproducing multiple video signals each having a different phase shift by reproducing the video signals successively and cyclically. Furthermore, another object of the present invention is to provide an interleave method of video signals by which the start point of a video signal of a specific phase is congruent to the end point of the same video signal in transmitting multi-phase video signals successively via a transmission line.

In order to accomplish the above purposes, a first aspect of the present invention provides a video recording and reproducing method comprising steps of:

dividing a video signal into k video blocks in a time-axis direction, wherein k is an integer not less than 2;

finding a block skip interval s which is an integer satisfying an equation $s=(pk+1)/n$ when p is an integer not less than 1 and n is an integer not less than 2;

interleaving said k video blocks in order of $$i=\{s(j-1)\}\bmod k+1$$

wherein i is an integer satisfying a relation $1\leq i\leq k$ and representing a block number of said video signal, and j is an integer satisfying a relation $1\leq j\leq k$ and representing an allocation block number on a storage medium; and allocating thus interleaved video blocks on said storage medium.

In addition, the video recording and reproducing method of the first aspect of the present invention reproduces the video blocks recorded on said storage medium cyclically in order of said block allocation number j at an n times faster transfer rate than a transmission rate peculiar to said video signal.

Furthermore, a second aspect of the present invention provides a video recording and reproducing apparatus comprising:

interleave parameter generating means for generating interleave parameters of a video signal to be recorded onto a storage medium;

recording block identification data generating means for generating a recording block identification data on the basis of said interleave parameters generated from said interleave parameter generating means, said recording block identification data representing a video block of said video signal to be recorded;

packetizing means for making a video packet of each video block, said video packet having an overhead portion multiplexed by said recording block identification data generated from said recording block identification data generating means;

recording/reproducing interface means for writing the video signal packetized in said packetizing means onto said storage medium in a predetermined format on the basis of said interleave parameters of said interleave parameter generating means and for reading out a video signal already recorded on the storage medium;

reproducing block identification data generating means for generating a reproducing block identification data of a video block of said video signal to be reproduced; and identification data judging & packet extracting means for comparing said reproducing block identification data generated from said reproducing block identification data generating means with said recording block identification data multiplexed in said overhead portion of said video packet to extract a desirable video packet.

In accordance with the video recording and reproducing method and apparatus of the present invention, a recording/reproducing head of a storage medium is moved sequentially and successively from a sector to an adjacent sector to read out a video signal from a storage medium. An average transfer rate is, therefore, greatly increased compared with random access method. An access time for the near video on demand service is fairly shortened. Recording format on the storage medium is free from the construction of the recording/reproducing head of a hard disk, and only the throughput of the hard disk restricts the maximum number of reproducible video signal phases. Accordingly the operational parameters of the near video on demand type video service, such as service interval and absolute time, can be freely determined. Furthermore memory capacity required for time-axis compression and expansion will be surely reduced, since both the end and start points of a video signal are congruent with each other in each phase video signal. This is because the extraction of a video signal (video packet) of a specific phase is cyclically repeated at constant cycles even during a section from the end point to the start point of the video signal in the same manner as other sections. Still further, if multiple transmission lines are provided to transmit all the multi-phase video signals to subscribers or an exchanger, each of the multiple transmission lines and each of multi-phase video signals are related one for one. Accordingly, administration of service time will be easy.

BRIEF DESCRIPTION OF THE DRAWINGS

The above and other objects, features and advantages of the present invention will become more apparent from the following detailed description which is to be read in conjunction with the accompanying drawings, in which:

FIGS. 1(A) to 1(D) are conceptual views cooperatively showing multiple access timing of the video data recording/reproducing method in an embodiment of the present invention;

FIG. 2(A) is a view showing a format conversion for s=3 in accordance with the video data recording/reproducing method of the present invention;

FIG. 2(B) is a view showing another format conversion for s=5 in accordance with the video data recording/reproducing method of the present invention;

FIGS. 4(A) and 4(B) are views respectively illustrating timing of output video signals adjoining each other;

FIGS. 14(A) to 14(F) are views showing timing of output signals generated from the timing signal generating section;

DETAILED DESCRIPTION OF THE PREFERRED EMBODIMENTS

Figure 3:
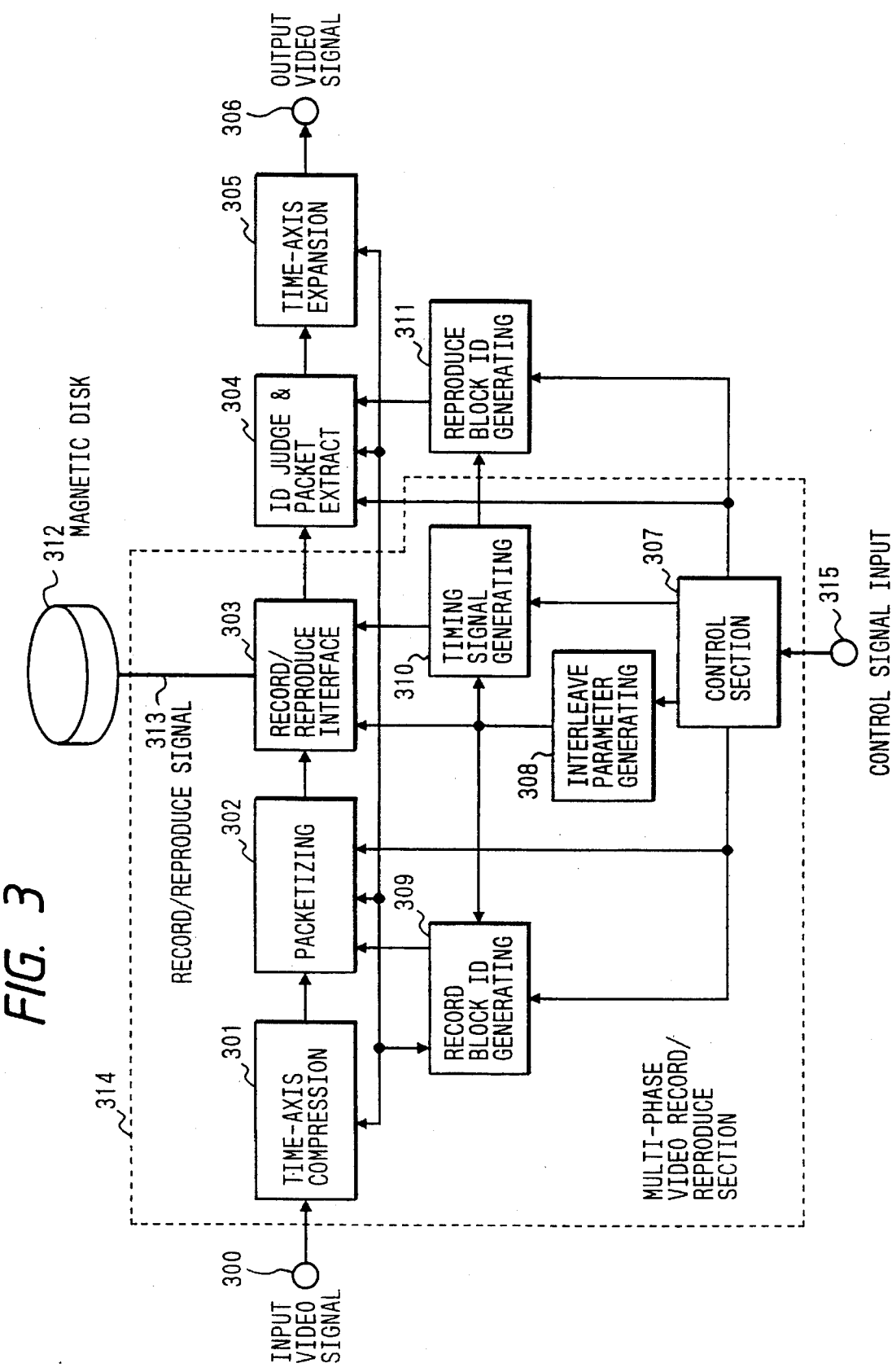
FIG. 3 is a block diagram showing the video data recording/reproducing apparatus in accordance with an embodiment of the present invention.

Hereinafter, preferred embodiments of the present invention will be explained in detail with reference to the accompanying drawings. FIGS. 1(A) to 1(D) are conceptual views cooperatively showing multiple access timing of the video data recording/reproducing method of the present invention, wherein FIG. 1(A) represents an input video signal with a program length Tp, FIG. 1(B) represents a recording/reproducing signal on/from a storage medium, FIG. 1(C) represents access points, and FIG. 1(D) represents a plurality of output video signals each having a different phase shift. The input video signal of FIG. 1(A) has a block dividing number k of 11 for simplification. In this case, assuming p=1 and n=4, the following equation (1) derives s=3. In general, the equation (1) defines the relation of integers k, p, n and s.

$$s=(pk+1)/n \qquad (1)$$

Wherein, p is not less than 1, k is not less than 2, and n is not less than 2.

Next, a recording operation onto the storage medium will be explained. A video signal, consisting of 11 blocks (referred to as video blocks hereinafter), is recorded onto a storage medium at a faster transfer rate equivalent to an interval shown by shaded portions of FIG. 1(B). For this high-speed recording, the storage medium has capability of recording or reproducing a video signal at an n times faster transfer rate. For example, the storage medium of the present invention will be constituted by a magnetic disk apparatus. Each video block of the video signal is finally compressed n times; i.e. reduced into 1/n, by time-axis compression. The magnetic disk apparatus is accessed by repeatedly moving a recording/reproducing head of the magnetic disk apparatus along the same recording area of the magnetic disk at intervals of Tp/n. With this access, while already recorded video blocks are reproduced, the above video blocks of the newly input video signal are successively recorded to succeed these already recorded video blocks until all the video blocks are completely recorded.

FIG. 2(A) illustrates the principle of above format conversion from the input video signal to the recording/reproducing signal. The input video signal of FIG. 1(A) arranges the divided 11 video blocks into a ring formation shown in FIG. 2(A). Beginning from a video block #1, relocation of video blocks is carried out by picking up a video block every s blocks. Namely, since the example of FIG. 2(A) is based on s=3, the video blocks are successively extracted in order of #1, #4, #7, #10, #2, #5, #8, #11, #3, #6, and #9. By completing the format conversion in this manner, the magnetic disk memorizes each video block i to correspond to a block allocation number j as shown in FIG. 2(A).

Namely, in accordance with the present invention, the recording/reproducing head of the magnetic disk is shifted cyclically in order of a block allocation number j. During one cycle of this shift movement of the head, video blocks with block numbers 1 to (i−1) are read out from the magnetic disk and a video block with a block number i is written onto a predetermined position of the magnetic disk.

Next, with reference to FIGS. 1(A) to 1(D), the method of reproducing a video signal, recorded through the above format conversion, and responding to each of video requests generated at a plurality of timings will be explained. As the recording/reproducing signal of FIG. 1(B) is transferred at an n times faster transfer rate, a leading information (numbered as "1" in the drawing) of the video signal is read out at cycles of Tp/n. Furthermore, video blocks of the video signal are read out successively from the leading information in order of "1", "2", "3"—. An average transmission rate of the extracted video signal, for example a shaded portion of FIG. 1(B), has the same transmission rate as that peculiar to the input video signal. Accordingly, by expanding this extracted video signal n times by time axis expansion, an output video signal can be obtained as shown by the shaded portion in FIG. 1(D).

In this manner, several access points are given at cycles of Tp/n as shown in FIG. 1(C). Depending on these access points, a plurality of output video signals are provided with different phase shifts as shown in FIG. 1(D). Thus, it becomes possible to select one of these output video signals in response to a user's request. In other words, a plurality of users can receive the same video signal simultaneously. The near video on demand service is thus realized. For example, assuming that a video signal is bandwidth compressed through high efficient coding and has a transmission rate of 1.5 Mbps (equivalent to MPEG1), the program length Tp is one hour, and a transfer rate of the magnetic disk is approximately 150 Mbps, the transfer rate ratio will be given to be approximately 100 times. This means that the waiting time required for access can be reduced less than 36 seconds.

Hereinafter, the format conversion (interleaving) method will be explained further with reference to FIG. 2(B). FIG. 2(B) shows another example of format conversion having a block number k of 12, with n=5, p=2, and s=5. In the same manner as FIG. 2(A), the format conversion is carried out by picking up a video block every s blocks. Namely, since this example of FIG. 2(B) is based on s=5, the video blocks are successively extracted in order of #1, #6, #11, #4, #9, #2, #7, #12, #5, #10, #3 and #8. In this case, by reproducing the video signal at an n times, i.e. five times, faster transfer rate, five output video signals each having a different phase shift are obtained in the same manner as in the previous example.

Hereinafter, the above format conversion using the integers p, k, n and s satisfying the above equation (1) will be further more discussed for generalization.

When the input video signal is X and a video block with a block number i is $x_i$, the input video signal X is expressed as follows.

$$X=(x_1, x_2, \text{—}, x_i, \text{—}, x_k) \quad (2)$$

Wherein, the block number i is an integer satisfying a relation $1 \leq i \leq k$.

Furthermore, when the video signal after format conversion is Y and a video block with a block allocation number j on the storage medium is $y_j$, the converted video signal Y is expressed as follows.

$$Y=(y_1, y_2, \text{—}, y_i, \text{—}, y_k) \quad (3)$$

Wherein, the block allocation number j is an integer satisfying a relation $1 \leq j \leq k$.

According to the previously described conversion, the video block $x_i$ being allocated to the video block $y_j$ is expressed by the following equation which generalizes the relation between the block number i and the block allocation number j.

$$i = \{s(j-1)\} \bmod k + 1 \quad (4)$$

With the block dividing number k and the block skip interval s satisfying the equation (1), the format conversion of above equation (4) is applied to a video signal. After the format conversion, the video signal is reproduced at an n times faster transfer rate (or by a transfer rate ratio n). Thus, n output video signals each having a different phase shift are obtained so as to be simultaneously reproducible as described previously.

Although the above embodiment is explained based on a premise that the format conversion is applied to a video signal having a specific length, it is also possible to determine an interleave format beforehand with respect to a specific, consecutively used area of a storage medium in accordance with the above method, allocating a video signal on this interleaved area in accordance with the above format conversion, with the remaining area being allocated by signals giving no adverse affection to the reproduction of the video signal.

Next, one example of a video recording/reproducing apparatus realizing the video recording/reproducing method of the present invention will be explained with reference to a block diagram of FIG. 3.

In the drawing: a reference numeral 300 represents an input terminal of a video signal, a reference numeral 301 represents a time-axis compression section, a reference numeral 302 represents a packetizing section, a reference numeral 303 represents a recording/reproducing interface section, a reference numeral 304 represents an identification data judging & packet extracting section, a reference numeral 305 represents a time-axis expansion section, a reference numeral 306 represents an output terminal of a video signal, a reference numeral 307 represents a control section, a reference numeral 308 represents an interleave parameter generating section, a reference numeral 309 represents a recording block identification data generating section, a reference numeral 310 represents a timing signal generating section, a reference numeral 311 represents a reproducing block identification data generating section, a reference numeral 312 represents a magnetic disk, a reference numeral 313 represents a recording/reproducing signal line, and a reference numeral 314 represents a multi-phase video signal recording/reproducing section.

First of all, an operation of recording an input video signal onto the magnetic disk 312 and reproducing a video signal with a specific phase shift from the magnetic disk 312 will be roughly explained. The video signal contains both video information and sound information which are bandwidth compressed respectively.

Figure 6:
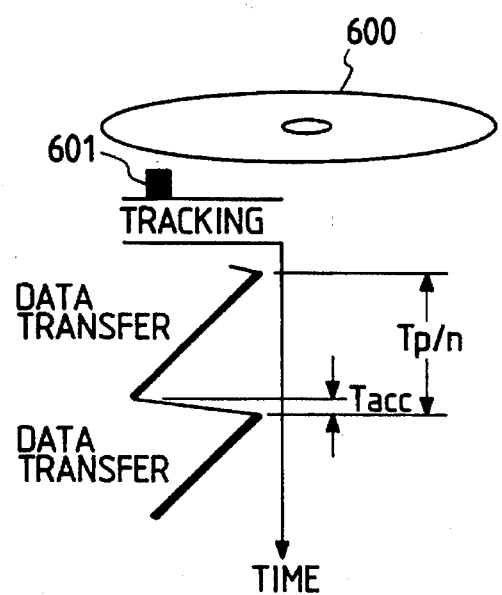
FIG. 6 is a view illustrating the tracking motion of a recording/reproducing head of a magnetic disk drive in accordance with the video data recording/reproducing method of the present invention.

In the time-axis compression section 301, each video block of the input video signal is time-axis compressed. The compressed video signal is supplied to the packetizing section 302. The packetizing section 302 allocates the compressed video signal into the information field, adding the identification information such as block identification data. The packetized video signal is, then, transmitted through the recording/reproducing interface 303 to the magnetic disk 312 and recorded thereon. In this recording onto the magnetic disk 312, each of the video blocks of the packetized video signal is recorded in a predetermined order defined by the format conversion explained with reference to FIGS. 1(A) and 1(B), as well as FIG. 2(A) or 2(B). As shown in FIG. 6 which illustrates a tracking motion of a recording/reproducing head of the magnetic disk, the head 601 moves in a radial direction of the magnetic disk so as to record each video block at a faster transfer rate previously described by successively repeating scanning operation of sector and track. When such radial tracking operations are repeated n times, all the input video signal is completely recorded onto the magnetic disk as explained with reference to FIG. 1. That is, the video signal of the recording/reproducing signal line 313 is formatted in the form of, for example, FIG. 2(A). Furthermore, in addition to such a recording operation, signals already recorded on the magnetic disk are read out. The read-out video signal of the recording/reproducing signal line 313, connecting the recording/reproducing interface 303 and the magnetic disk 312, is as shown in FIG. 1(B).

The identification data judging & packet extracting section 304 extracts designated packets having a specific phase shift successively upon a user's request, in an order based on the identification data attributed to each packet which is multiplexed with the video block during the previously explained recording operation. Thus extracted video signal is supplied to the time-axis expansion section 305, in which the video signal is time-axis expanded to produce an output video signal finally output from the output video terminal 306.

The control section 307 generates various control signals, such as recording, reproducing or special reproducing signals, and sends them to corresponding sections of this apparatus in response to the user's request. The interleave parameter generating section 308 has a function of determining the interleave format. The control section 307 provides the interleave parameter generating section 308 with necessary information, such as a service time interval of operation determined beforehand, a transmission rate of an input video signal, a program length Tp, an average transfer rate and utilization area of the magnetic disk 312. Using the previously explained equations (1) and (3), the interleave parameter generating section 308 determines various parameters on the basis of these given information. Thus determined parameters are supplied to the related sections of the apparatus. Based on these parameters, the timing signal generating section 310 produces various timing signals necessary for time-axis compression, time-axis expansion, packetizing, packet extracting, recording onto or reproducing from the magnetic disk or else.

As explained above, the present embodiment executes the format conversion of a video signal and the high-speed recording/reproducing onto/from the magnetic disk, thus providing the simultaneous reproduction of multiple video signals each having a different phase shift and simplifying the tracking motion of the head of the magnetic disk. Accordingly, access time loss due to the mechanical shift motion of a head can be shortened compared with the random access operation. An optimum transfer rate comparative to the maximum transfer rate of the magnetic disk can be assured. Hence, the present embodiment makes it possible to provide a video recording/reproducing apparatus capable of responding each user's request within a reasonably short time.

Next, circuit configuration, operation and effect of essential blocks will be explained in more detail.

Figure 7:
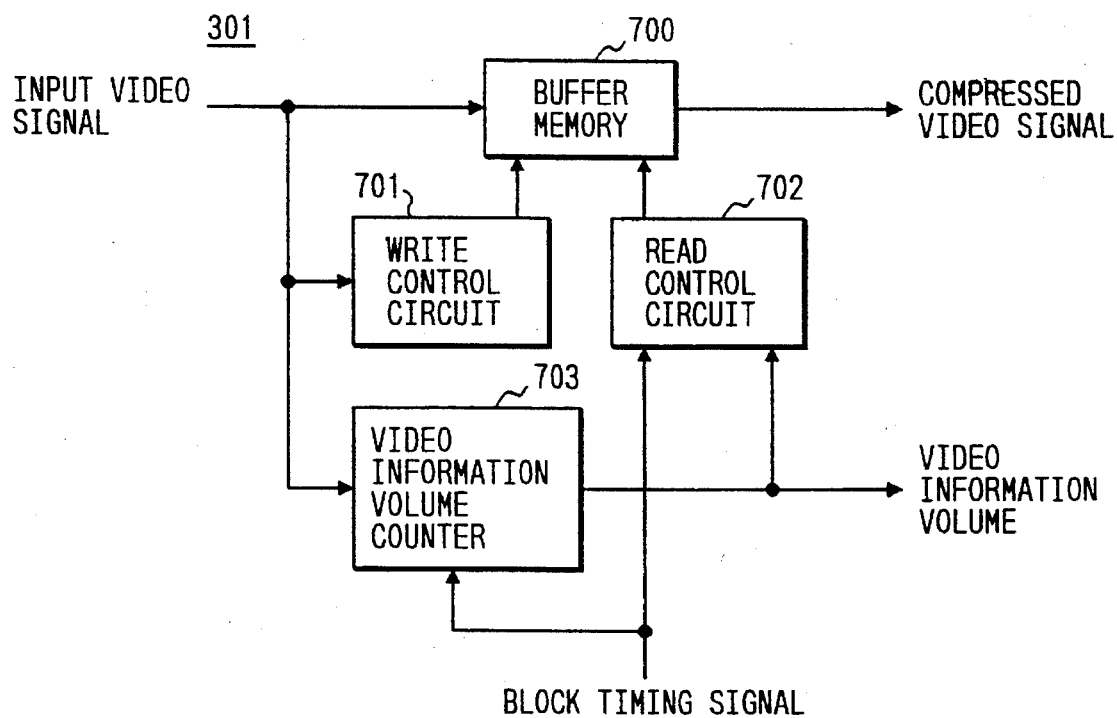
FIG. 7 is a block diagram showing a time-axis compression section.
Figure 8:
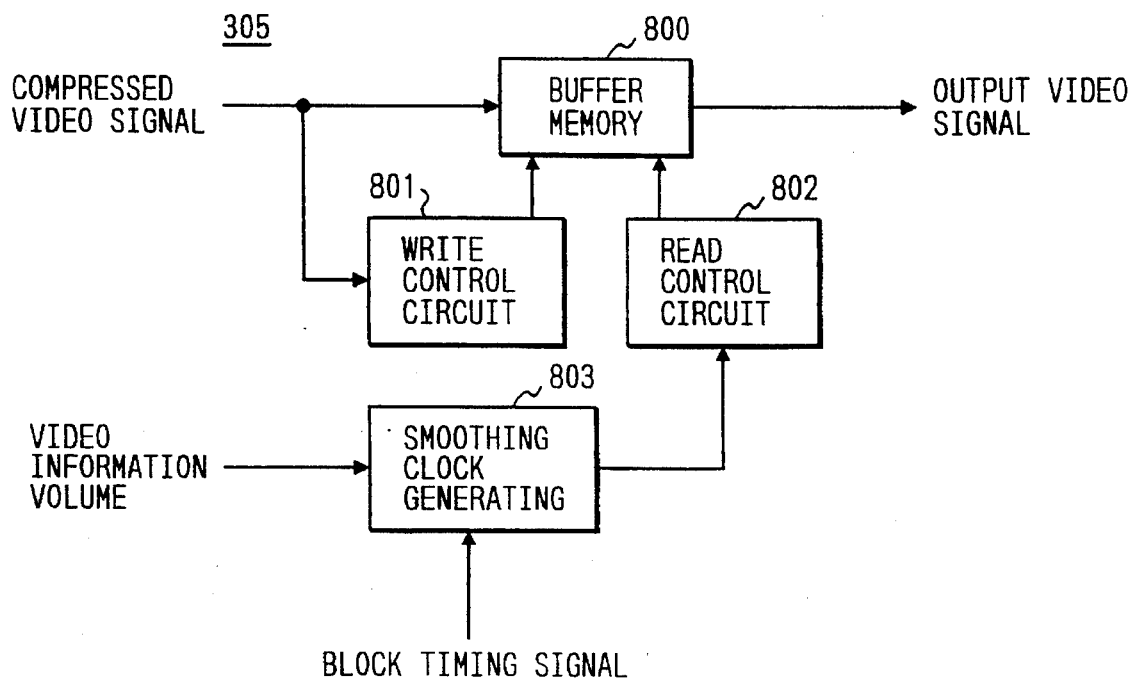
FIG. 8 is a block diagram showing a time-axis expansion section.

FIGS. 7 and 8 are detailed block diagrams showing the time-axis compression section 301 and the time-axis expansion section 305 of FIG. 3. In FIG. 7: a reference numeral 700 represents a buffer memory used for time-axis compression, a reference numeral 701 represents a write control circuit used for writing an input video signal into the buffer memory 700, a reference numeral 702 represents a read control circuit used for reading a video signal memorized in the buffer memory 700 in response to a block timing signal (refer to FIG. 14(D) supplied from the timing signal generating section 310, and a reference numeral 703 represents a video information volume counter for counting the data amount of each video block of the input video signal received during a period determined by the above block timing signal. The time-axis compression of each video block of the video signal is carried out in such a manner that a reading-out speed is set at a faster speed with respect to a writing speed into the buffer memory 700 by taking account of previously described transfer rate ratio n and an overhead insertion for packetizing of the next step. The read control circuit 702 reads out a video signal from the buffer memory 700 in accordance with the information volume of one video block corresponding to one cycle of the block timing signal.

In FIG. 8: a reference numeral 800 represents a buffer memory used for time-axis expansion, a reference numeral 801 represents a write control circuit used for writing a compressed video signal supplied from the identification data judging & packet extracting section 304 into the buffer memory 800, a reference numeral 802 represents a read control circuit used for reading out a video signal from the buffer memory 800, and a reference numeral 803 represents a smoothing clock generating circuit for generating a smoothed clock serving as a reading clock used in the read control circuit 802 on the basis of the video information volume supplied from the identification data judging & packet extracting section 304 and the block timing signal.

As shown in the timing chart of FIG. 14(A) to 14(F), each video block of the input video signal is time-axis compressed in the time-axis compression section 301 to obtain compressed video blocks to be recorded as indicated by shaded portions of FIG. 14(B). On the contrary, each of the compressed video blocks is time-axis expanded in the time-axis expansion section 305 to obtain an output video signal of FIG. 14(C) having the same transfer rate as the input video signal.

Since a video signal contains a large volume of information, the buffer memories used for the previously described time-axis compression/expansion are generally required to have a correspondingly large capacity. However, if the block dividing number k is increased, the size of each video block is reduced. Therefore, by increasing the block dividing number k, it becomes possible to reduce the capacity required for these buffer memories. FIG. 4(A) shows phase relation of four-phase video signals reproduced with the block dividing number k=11. FIG. 4(B) shows phase relation of a plurality of video signals reproduced with the block dividing number k=∞. As shown in FIG. 4(A), an entire block is expressed by a two-dimensional matrix wherein large blocks each consisting of three blocks are successively dissected from the leading block, although the last large block includes only two blocks. In FIG. 4(A), each of blocks is generally represented by $i(i_1, i_0)$, wherein $i_1$ is a large block number and $i_0$ is a small block number. These block numbers $i_1$ and $i_0$ are to be down counted, respectively.

Although there is found one block deviation between adjoining two of output video signals $\phi 1 - \phi 4$, the large blocks of the video signals are roughly continuously arranged. If the dividing number k is set to be fairly large with respect to the total phase number n, above one block can be almost ignored. Namely, as shown in FIG. 4(B) which shows only the arrangement of large blocks, the output video signals $\phi 1 - \phi 4$ are mutually related to arrange the large blocks into a lattice formation. Accordingly, an identification number of this large block will become a preferable block identification data of the video packet to be recorded on the recording medium. Thus, designation of the large block number will bring a quick video signal seek moving across respective phases in the reproduction. Accordingly, a video signal reproduction is carried out by a special play scanning a large block as a unit of reproduction.

The above-described method of dividing the video signal into large blocks is generalized by the following equation, using the previously described interleave parameters k and n.

h=ceil (k/n) —(5)

Wherein, h is an integer corresponding to a maximum number of small blocks. Therefore, a large block is dissected so as to consist of h blocks. In this case, the dividing number g of large blocks, i.e. a maximum number of large blocks, with respect to an entire video signal is defined as follows.

g=n —(6)

The expression ceil () means a minimum integer not smaller than a value inside ().

Above-explained two-dimensional generation method of the block identification data will be explained below.

Figure 9:
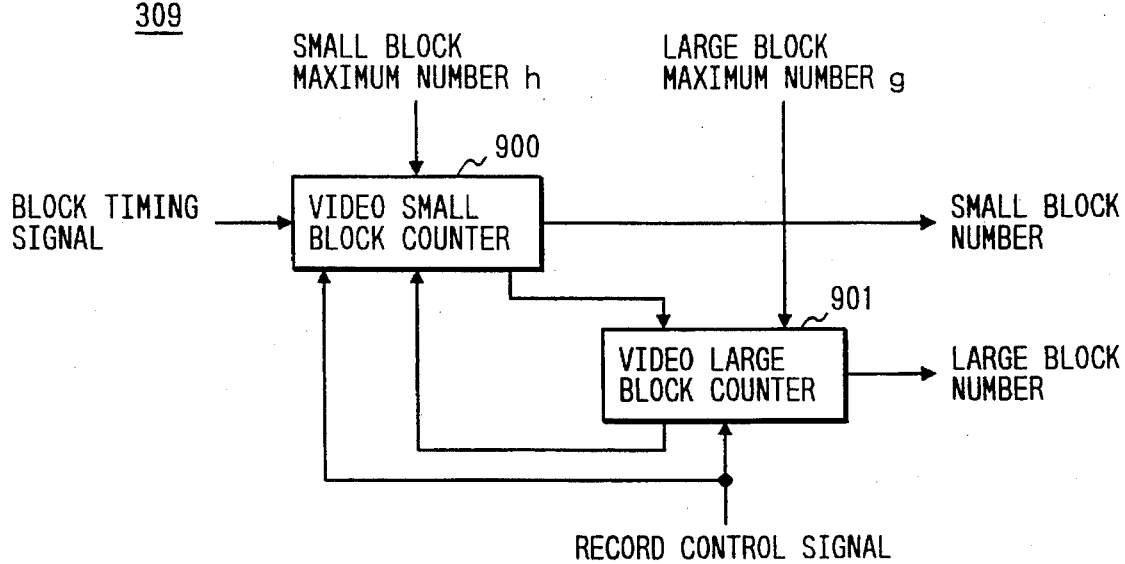
FIG. 9 is a block diagram showing a recording block identification data generating section.
Figure 10:
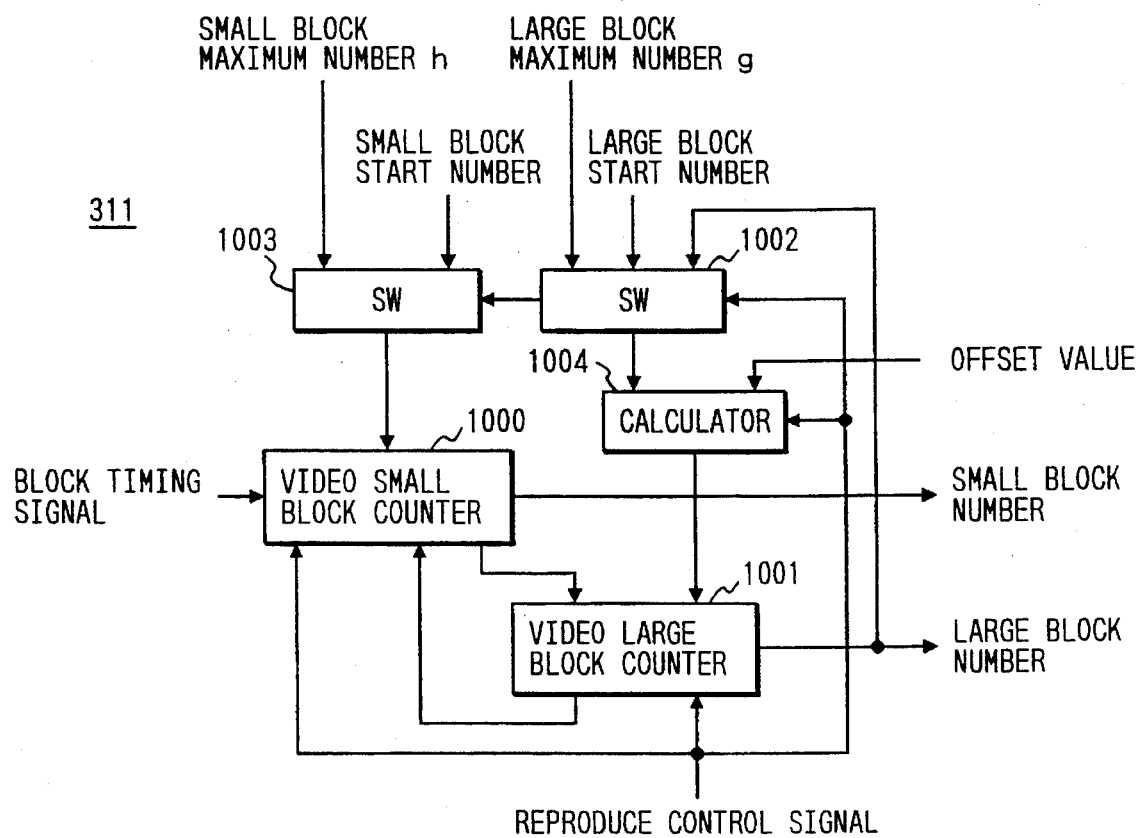
FIG. 10 is a block diagram showing a reproduction block identification data generating section.

FIGS. 9 and 10 are detailed block diagrams showing the recording block identification data generating section 309 and the reproducing block identification data generating section 311. The recording block identification data generating section 309 receives various data, such as the small block maximum number h and the large block maximum number g determined by the interleave parameter generating section 308 based on the equations (5) and (6), a record control signal supplied from the control section 407 to command recording of a video signal onto the recording medium, and the block timing signal supplied from the timing signal generating section 310. With reference to these data, the recording block identification data generating section 309 generates the recording block identification data and outputs it to the packetizing section 302.

In FIG. 9, at the start time of recording operation specified by the record control signal, the small block maximum number h and the large block maximum number g are input into a video small block counter 900 and a video large block counter 901, respectively. The video small block counter 900 executes cyclic count down modulo the small block maximum number h in response to the block timing signal. The video large block counter 901 executes count down in response to a terminal count of the video small block counter 900 from the large block maximum number g. The count values thus generated from both counters 900 and 901 are output as a small block number and a large block number used for recording, respectively.

The reproducing block identification data generating section 311 of FIG. 3 is given the block timing signal, the small block maximum number h and the large block maximum number g in the same manner as the previously described recording block identification data generating section 309. Furthermore, the control section 307 supplies a start point designated by a user (i.e. a receiving terminal) in the form of a small block start number and a large block start number. Still further, the reproducing block identification data generating section 311 receives another data, such as a reproduction control signal controlling normal reproduction and special reproduction, and an offset value representing a transition amount of a large block in the special reproduction. Based on these data, the reproducing block identification data generating section 311 generates a block identification data of a video signal to be output, and supplies it to the identification data judging & packet extracting section 304. In a case where normal video signal reproduction is executed in FIG. 10, the small block maximum number h and the large block maximum number g are input into a video small block counter 1000 and a video large block counter 1001 through switches 1002 and 1003, respectively, in response to the reproduction control signal. And, a small block number and a large block number used for reproduction are generated in the same manner as the operation of the recording block identification data generating section.

For realization of the special reproduction utilizing transition across phases, a calculator 1004 adds an offset value to an output of the switch 1002 so as to vary the large block number. In this case, by setting the offset value to be a predetermined value in the control section 307, a large block can be shifted in the direction of an arrow A, B or C in FIG. 4(B). This brings the effect of chapter feed, chapter rewind, and chapter stop to the special reproduction. Furthermore, the down count operation of reading the maximum number is advantageous in simplifying the counter construction used for generating the block identification data.

Figure 11:
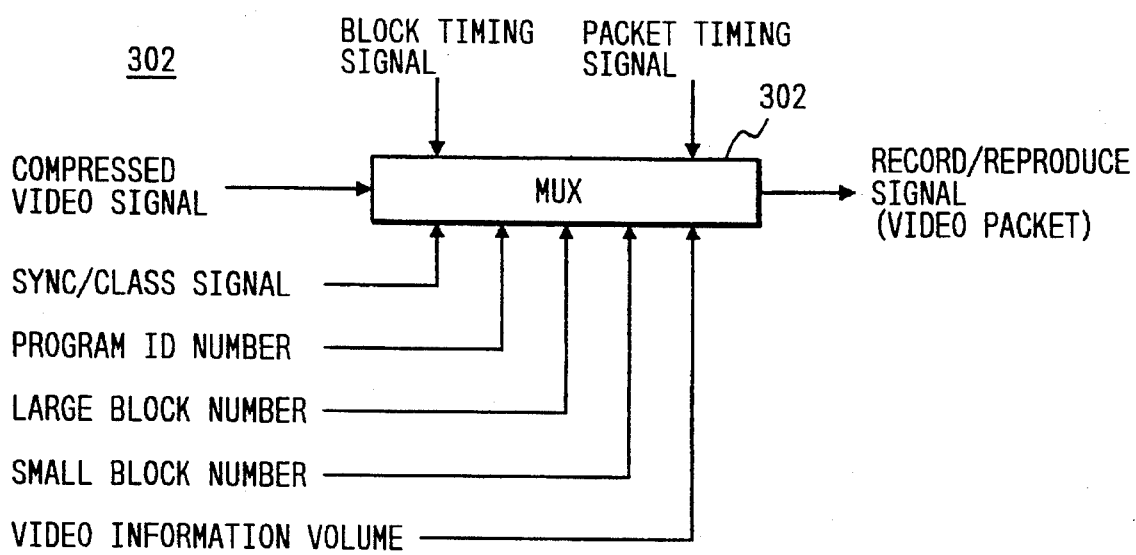
FIG. 11 is a block diagram showing a packetizing section.
Figure 12:
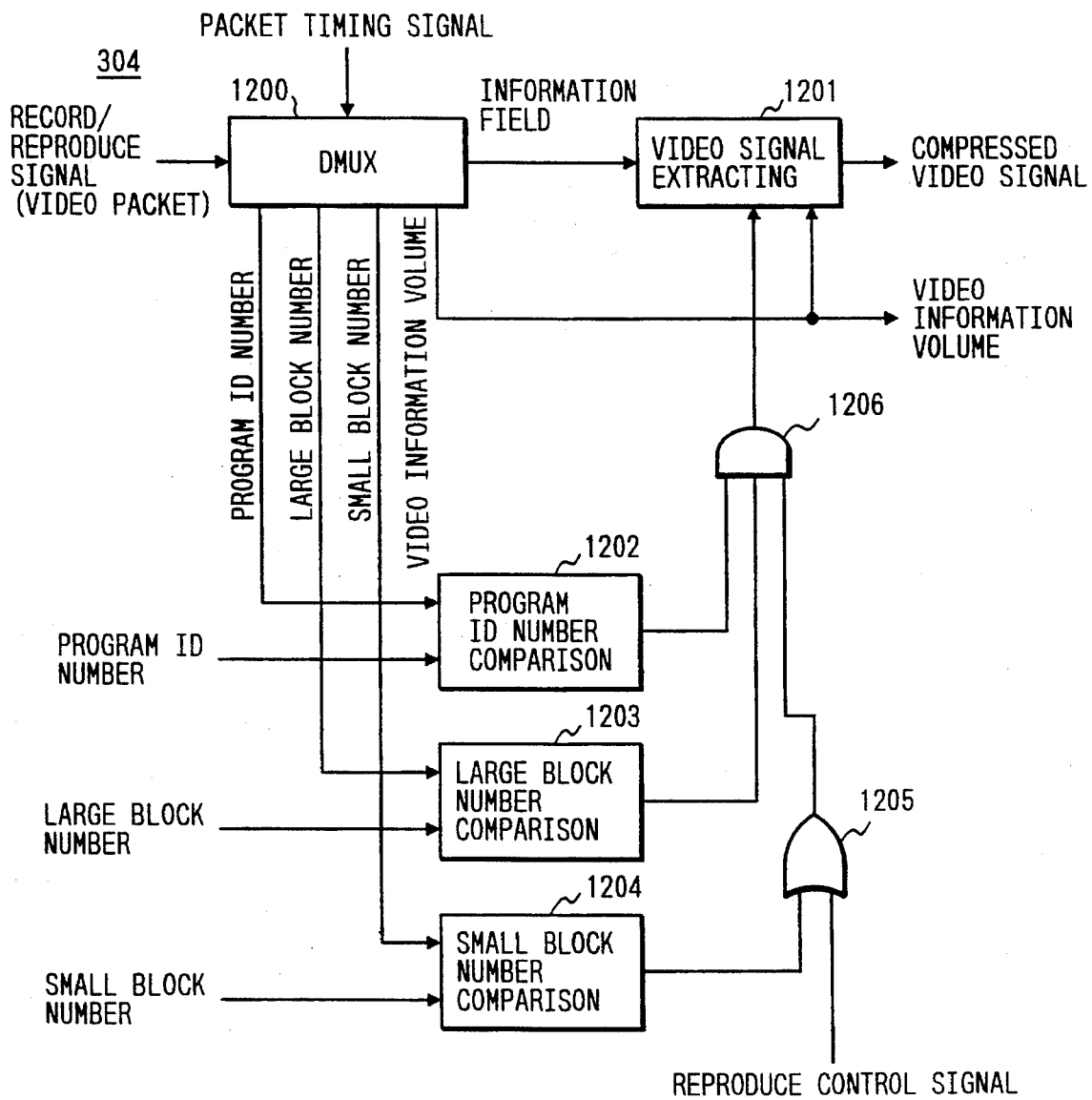
FIG. 12 is a block diagram showing an identification data discriminating & packet extracting section.

FIGS. 11 and 12 are detailed block diagrams showing the packetizing section 302 and the identification data judging & packet extracting section 304 of FIG. 3. The packetizing section 302 is constituted by a multiplexer receiving several information, such as a sync/class signal for discriminating a brake and a class of a packet and a program identification number peculiar to a program to be recorded, from the control section 307. The packetizing section 302 further receives another information, such as the large block number and the small block number, from the previously explained recording identification data generating section 309. Still further, the packetizing section 302 is given the video information volume of a video block to be multiplexed, which is fed from the time-axis compression section 301. These data are multiplexed into the overhead portion of a packet in response to a block timing signal and the packet timing signal (refer to FIGS. 14(D) and 14(E)) supplied from the timing signal generating section 310. On the other hand, one video block of the video signal to be recorded, having been compressed in the time-axis compression section 301, is multiplexed into the information field of the packet. Thus packetized video signal is then supplied to the recording/reproducing interface section 303.

Figure 5:
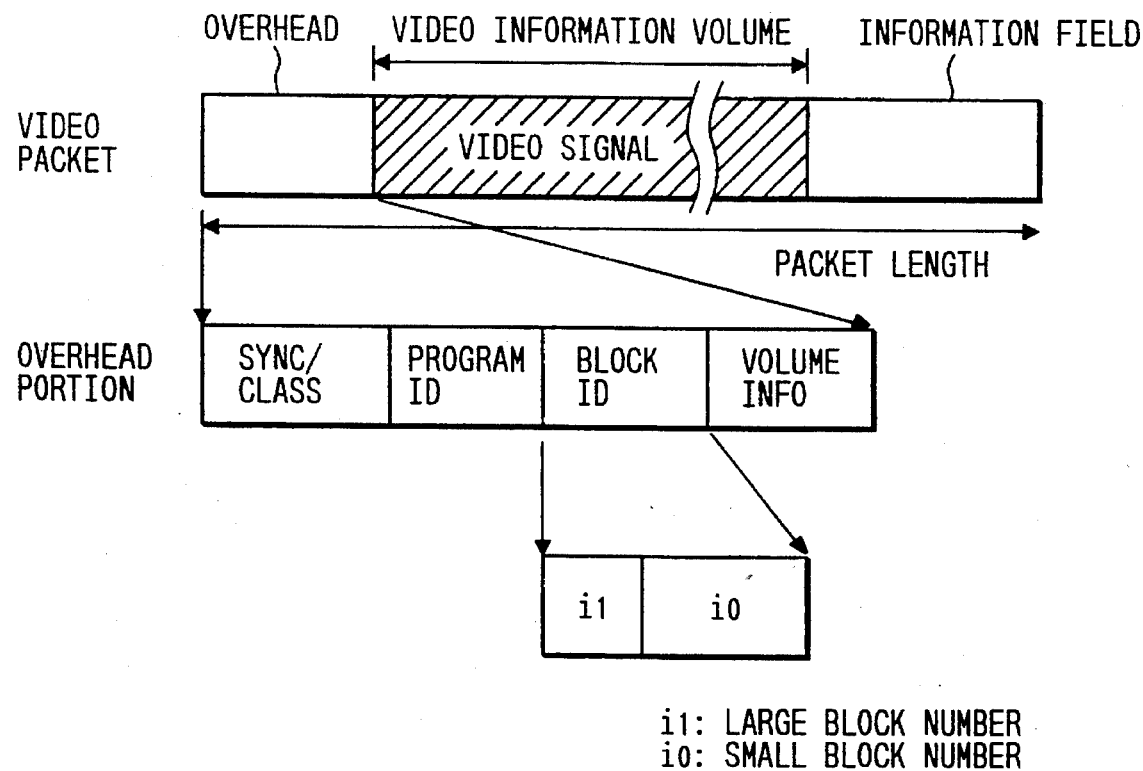
FIG. 5 is a view showing allocation of video block and identification data on a packet in accordance with the video data recording/reproducing method of the present invention.

FIG. 5 shows a detailed format of the packet to be supplied to the recording/reproducing interface section 303. Shaded portions of FIG. 14(B) show allocation of packets including the video blocks to be recorded with respect to the entire recording/reproducing signal. In FIG. 5 the information field of the video packet is multiplexed by a video signal whose amount is represented by the video information volume, with remaining part filled with stuff. If the length of the packet is selected to be a fixed length equal to a multiple of the length of a sector of the magnetic disk 312, allocation to a plurality of storage media and recording/reproducing control will be simplified. The video signal used in this embodiment is allocated on the magnetic disk 312 with a blank determined by a maximum memory capacity or utilization area of the magnetic disk 312.

In the identification data judging & packet extracting section of FIG. 12, a demultiplexer 1200 receives each packet of a recording/reproducing signal supplied from the recording/reproducing interface 303 and picks up the program identification number, the large block number, the small block number and the video information volume from the overhead portion of the video packet in response to the packet timing supplied from the timing signal generating section 310. The program identification number, the large block number, the small block number and the video information volume thus extracted are supplied to a program identification number comparison circuit 1202, a large block number comparison circuit 1203, a small block number comparison circuit 1204, and the previously described time-axis expansion section 305, respectively. Furthermore, the remainder of the information field is supplied to a video signal extracting circuit 1201. The program identification number comparison circuit 1202 compares the input program identification number with a given program identification number supplied from the control section 307. The large block number comparison circuit 1203 compares the input large block number with a given large block number supplied from the reproduction block identification data generating circuit 311. The small block number comparison circuit 1204 compares the input small block number with a given small block number supplied from the reproduction block identification data generating circuit 311. Only when the comparisons are all congruent in the comparison circuits 1202, 1203 and 1204, the video signal extracting circuit 1201 extracts the video signal multiplexed in the information field of thus identified packet in accordance with the video information volume thereof. Thereafter, the extracted video signal is supplied to the time-axis expansion section 305.

There is provided an OR circuit 1205 having one input terminal receiving the reproduction control signal supplied from the control section 307 and the other input terminal receiving the output signal of the small block number comparison circuit 1204. This arrangement is advantageous for the execution of the previously explained special reproduction. That is, the output signal of the small block number comparison circuit 1204 is gate controlled by the reproduction control signal; therefore, the judgement of the small block number comparison circuit 1204 is no longer used to extract a packet. There is further provided an AND circuit 1206 which obtains AND result of three outputs of the program identification number comparison circuit 1202, the large block number comparison circuit 1203 and an OR circuit 1205. Hence, the video signal extracting circuit 1201 can quickly pick up a video signal from a video packet which arrives earliest among the multiple-phase video signals. With this arrangement, it becomes possible that a plurality of video signals each having a different phase shift are extracted from a recording/reproducing signal. In addition, it becomes possible to identify a plurality of video signals based on the program number and selectively reproduce them.

Figure 13:
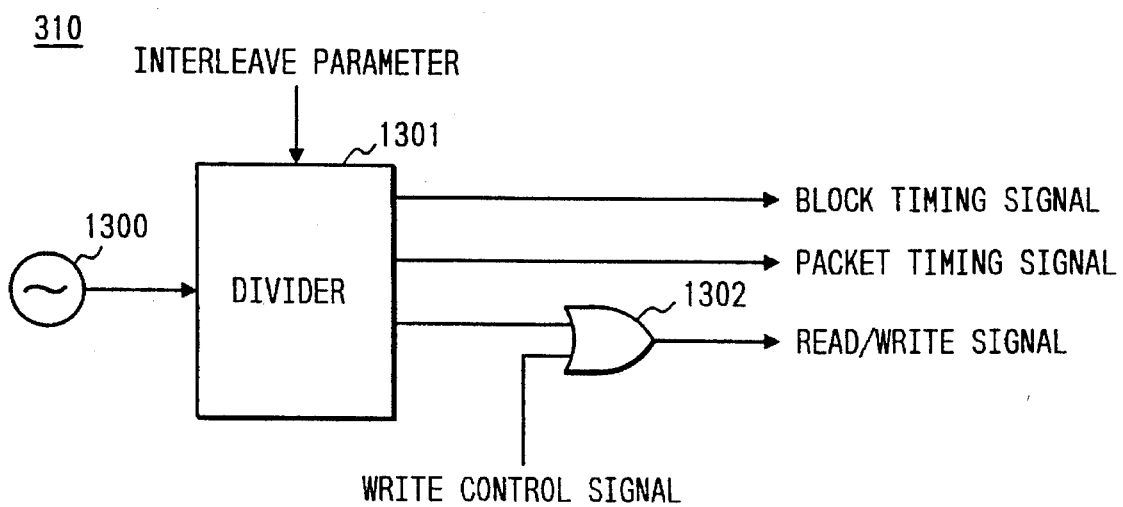
FIG. 13 is a block diagram showing a timing signal generating section.

FIG. 13 is a detailed block diagram showing the timing signal generating section 310 of FIG. 3. A divider 1301 divides a clock supplied from a highly accurate, built-in, clock generator 1300 on the basis of various interleave parameters supplied from the interleave parameter generating section 308, so as to generate the block timing signal and the packet timing signal which are supplied to the related sections. There is provided an OR circuit 1302 receiving an output signal of the divider 1301 and a write control signal supplied from the control section 307 for controlling recording of a video signal onto the magnetic disk 312. An output signal of this OR circuit 1302 is obtained as a read/write signal which is supplied to the recording/reproducing interface section 303. The relation of the input/output video signals and various timing signals are illustrated in FIGS. 14(A) to 14(F). It will be preferable to generate several phase signals by taking account of delay times involved in the actual recording and reproducing systems or else.

The recording/reproducing interface section 303 of FIG. 3 has a function of recording a video signal onto the magnetic disk 312 in the format previously described at a faster transfer rate, and reproducing the recorded signal cyclically at a faster transfer rate. The head of the magnetic disk 312 is controlled based on a signal supplied from the interleave parameter generating section 308, and causes a simple, cyclic shift motion along a specific area as previously explained with reference to FIG. 6. Furthermore, in accordance with the packet timing signal and the read/write signal supplied from the timing signal generating section 410, access to the magnetic disk medium is repeated for recording and reproducing. Accordingly, the recording/reproducing interface section 303 can be constituted by an interface (for example, SCSI) which is generally used to connect a magnetic disk and a computer. It is however possible to simplify it to reduce cost since required operation is simple.

Figure 15:
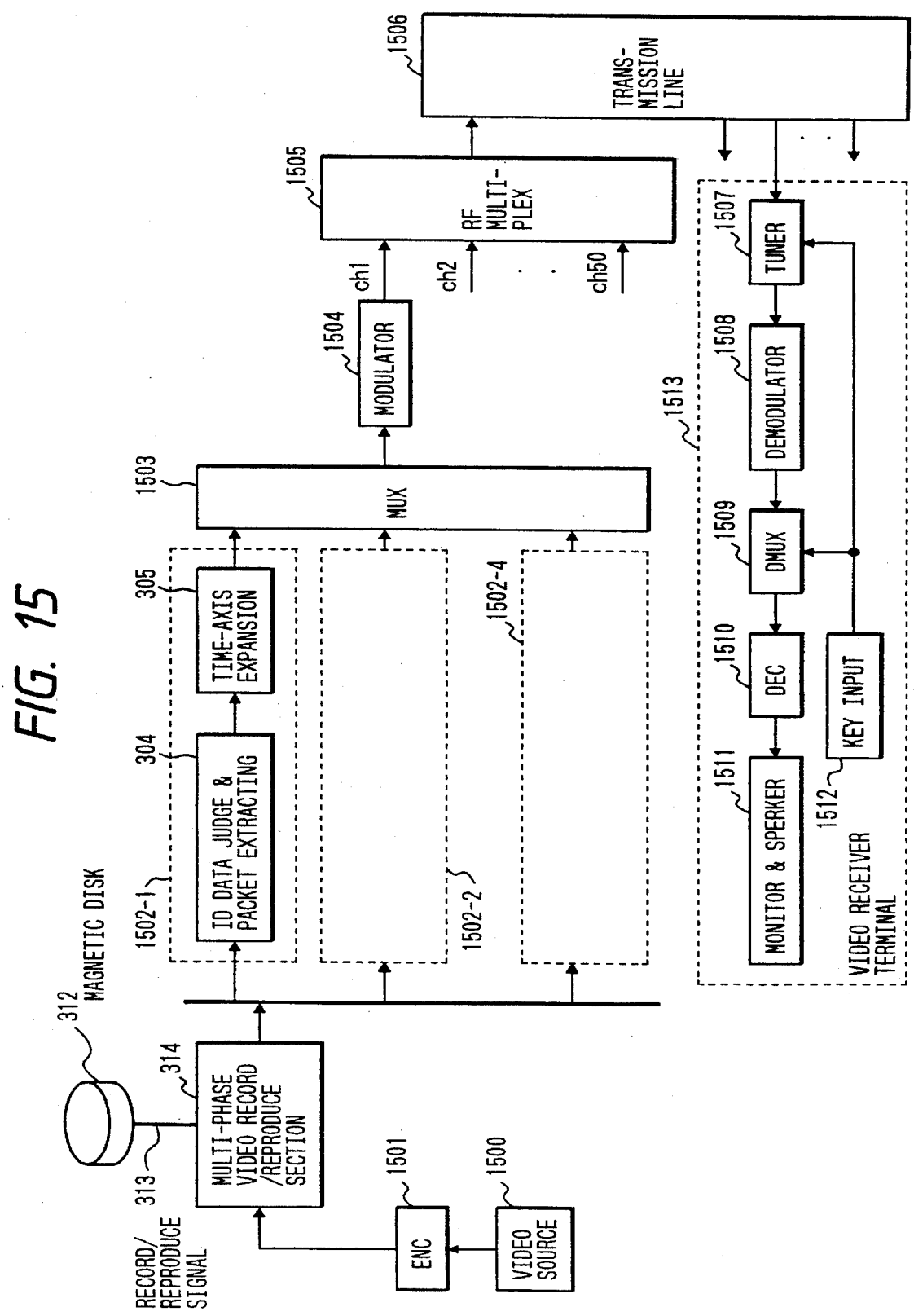
FIG. 15 is a schematic diagram showing a video transmission system, wherein the video recording/reproducing apparatus of the present invention is used in a tree-type network.

FIG. 15 is a schematic diagram showing a video transmission system, wherein the video recording/reproducing apparatus of the present invention is used in a tree-type network, such as CATV. In this drawing, a multi-phase video recording/reproducing section 314 is equivalent to a portion encircled by a dotted line in FIG. 3. In this system, there are provided multiple, parallel signal transmission lines each including a pair of the identification data judging & packet extracting section 304 and the time-axis expansion section 305 so as to reproduce all the reproducible multi-phase video signals each having a different phase shift. These reproducible, multi-phase video signals are multiplexed in a multiplexer 1503, and then digital modulated into a QAM signal or the like in a modulator 1504 to transmit it by CATV network. A reference numeral 1505 represents an RF multiplexer and a reference numeral 1506 represents a transmission line, both being used for the CATV transmission. A video receiver terminal 1513 has a tuner 1507 to select a desirable video channel, a demodulator 1508 demodulating the digital modulated signal, a demultiplexer 1509 selecting the desired phase video signal, a decoder 1510 decoding the selected video signal, a monitor displaying the video signal and a speaker outputting a sound signal. A reference numeral 1512 represents a key input circuit supplying a key input to the tuner 1507 and the demultiplexer 1509. With this arrangement, it will be apparent that the video recording/reproducing apparatus of the present invention can be applied to the today's CATV network. It will be possible to provide a near video on demand service which is relatively long in waiting time but cheap in cost. By the way, the time-axis expansion circuit 305 in this embodiment can be relocated in the video receiver terminal 1513.

Figure 16:
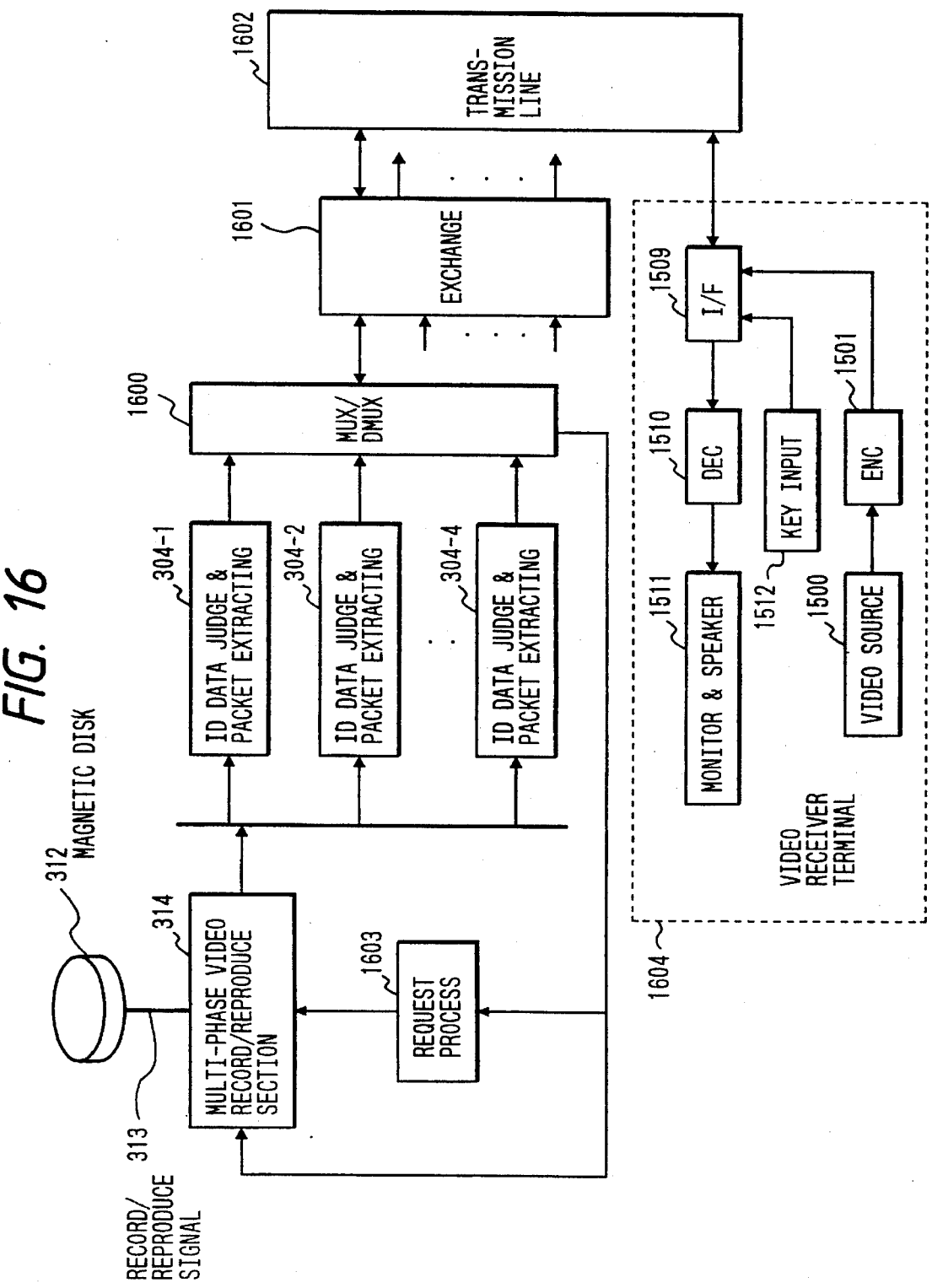
FIG. 16 is a schematic diagram showing another video transmission system, wherein the video recording/reproducing apparatus of the present invention is used in a star-type network.

FIG. 16 is a schematic diagram showing another video transmission system, wherein the video recording/reproducing apparatus of the present invention is used in a star-type network, such as a future telephone communication line with large transmission capacity or a bidirectional CATV. This system is different from that of FIG. 15 in that a large capacity exchanger 1601 which allocates bidirectional lines to the users is located in a central office together with the video recording/reproducing apparatus. The exchanger 1601 selects an appropriate video signal in response to a user's request and transmits it to a video transmitter/receiver terminal 1604. Furthermore, the request signal or the video signal generated from a user is supplied to the multi-phase video recording/reproducing section 314 through the exchanger 1601. With this arrangement, a bidirectional video service with a large scale and less waiting time will be feasible in the near future.

Furthermore, it is also possible to transmit the interleaved recording/reproducing signal itself at a faster speed to a hub, in which the video recording/reproducing apparatus of the present invention is incorporated. In this case, the interleaved recording/reproducing signal is developed into multiple phases. Thus, it becomes possible to reduce the load of the transmission line of the network.

As explained in the foregoing description, the present invention not only solves the problems encountered in the conventional art but realizes a video service which is not restricted by the number of users. Furthermore, the tracking mechanism of a storage medium, such as a magnetic disk and an optical disk, is released from the irregularity of access. Thus, the life of tracking mechanism can be extended further. Accordingly, the video recording/reproducing method and apparatus of the present invention brings a moving picture data base capable of providing an excellent, highly reliable, long time video service. Furthermore, it is possible to realize dummy operations of fast forward and rewind during the reproduction of a video signal. Therefore, it gives a user a circumstance like the user is in front of a VCR. Still further, the capacity of a memory required for time-axis compression/expansion can be reduced by dividing a video signal into a large number of blocks. Cost reduction of the apparatus is also possible.

Although the above embodiments include some electric circuits for realizing some part of function, it will be apparent that these electric circuits can be replaced by a computer whose function is determined by a software program. If the recording operation is executed by the non-real time processing of the software program, it will become possible to realize the previously explained format on the storage medium.

The transmission rate peculiar to the video signal, discussed in the above embodiments, is equal to an average transmission rate for the variable bit rate video transmission and should not be limited to a constant bit rate alone.

The reproduction block identification data generating circuit 311 is omitted in the embodiments of FIGS. 15 and 16 for simplification. However, it will be preferable to provide the same number of the reproduction block identification data generating circuits 311, 311,—as the reproducible phase number and arrange them so that an output signal from a reproduction block identification data generating circuit 311 is supplied to a corresponding identification data judging & packet extracting section 304.

Although the magnetic disk apparatus is explained as an example of the storage medium in the above embodiments, it is needless to sat that the magnetic disk apparatus can be replaced by other medium, such as an optical disk apparatus, a magneto-optical disk apparatus, a magnetic tape apparatus, or a large-capacity solid state memory. If the solid state memory is used, the waiting time will be fairly shortened since the processing is speeded up greatly. The principle simplifying the tracking of the disk apparatus is equally applied to simplify a memory address generating section. At the same time, as a bus consisting of high-speed recording/reproducing signals has a constant speed, the construction of the system is far from failure compared with a bus used by random access.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A video recording and reproducing method comprising steps of:

dividing a video signal into k video blocks in a time-axis direction, wherein k is an integer not less than 2;

finding a block skip interval s which is an integer satisfying an equation s=(pk+1)/n when p is an integer not less than 1 and n is an integer not less than 2;

interleaving said k video blocks in order of $$i=\{s(j-1)\} \bmod k+1$$

wherein i is an integer satisfying a relation $1 \leq i \leq k$ and representing a block number of said video signal, and j is an integer satisfying a relation $1 \leq j \leq k$ and representing an allocation block number on a storage medium; and allocating thus interleaved video blocks on said storage medium.

2. A video recording and reproducing method in accordance with claim 1, wherein the video blocks recorded on said storage medium are reproduced cyclically in order of said block allocation number j at an n times faster transfer rate than a transmission rate peculiar to said video signal.

3. A video recording and reproducing method in accordance with claim 2, wherein a recording/reproducing head of said storage medium is shifted repeatedly at predetermined cycles in order of said block allocation number j, each cycle comprising steps of:

reading out video blocks having block numbers 1 to (i−1) from said storage medium; and writing a video block having a block number i onto a predetermined position of said storage medium.

4. A video recording and reproducing method in accordance with claim 2, wherein said video signal contains video information and sound information which are bandwidth compressed.

5. A video recording and reproducing method in accordance with claim 1, further comprising steps of:

generating a video packet for each of said video blocks;

multiplexing said each of said video blocks into an information field of said video packet;

multiplexing block identification data into an overhead portion of said video packet, said block identification data corresponding to the block number i of the video block to be multiplexed in the information field of said video packet; and recording said video packet onto said storage medium.

6. A video recording and reproducing method in accordance with claim 5, wherein said video packet has a constant length, and an information volume of said video block to be multiplexed in the information field is multiplexed into said overhead portion of said video packet.

7. A video recording and reproducing method in accordance with claim 1, wherein said video signal is allocated with a blank determined by a maximum memory capacity or utilization area of said storage medium.

8. A video recording and reproducing method in accordance with claim 1, wherein said video signal read out from said storage medium in order of the block allocation number j is transmitted via a transmission line.

* * * * *